(12) United States Patent
Olson et al.

(10) Patent No.: US 11,039,612 B2
(45) Date of Patent: Jun. 22, 2021

(54) SYSTEM AND METHOD FOR TREATING ITEMS WITH INSECTICIDE

(71) Applicant: ECOLAB USA INC., St. Paul, MN (US)

(72) Inventors: Joelle Olson, Eagan, MN (US); Sherri Tischler, Eagan, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/552,044

(22) PCT Filed: Feb. 26, 2016

(86) PCT No.: PCT/US2016/019823
§ 371 (c)(1),
(2) Date: Aug. 18, 2017

(87) PCT Pub. No.: WO2016/138409
PCT Pub. Date: Sep. 1, 2016

(65) Prior Publication Data
US 2018/0035665 A1  Feb. 8, 2018

Related U.S. Application Data

(60) Provisional application No. 62/121,852, filed on Feb. 27, 2015.

(51) Int. Cl.
*A01N 25/18* (2006.01)
*A01N 25/34* (2006.01)
(Continued)

(52) U.S. Cl.
CPC ........... *A01N 25/18* (2013.01); *A01M 1/2055* (2013.01); *A01N 25/00* (2013.01); *A01N 25/34* (2013.01)

(58) Field of Classification Search
CPC ........ A01N 25/18; A01N 25/00; A01N 25/34; A01M 1/2055
(Continued)

(56) References Cited

U.S. PATENT DOCUMENTS 3,659,373 A    5/1972   Daeninckx
3,698,964 A   10/1972   Caule et al.
(Continued)

FOREIGN PATENT DOCUMENTS

CN         1219352         6/1999
DE    88 12 770.2 U1    11/1988
(Continued)

OTHER PUBLICATIONS

Bond et al., Neem Oil General Fact Sheet, Date Reviewed: Mar. 2012, National Pesticide Information Center, Oregon State University Extension Services. http://npic.orst.edu/factsheets/neemgen.html. http://npic.orst.edu/factsheets/neemgen.html (Year: 2012).*
(Continued)

*Primary Examiner* — Chee-Chong Lee
(74) *Attorney, Agent, or Firm* — Merchant & Gould P.C.

(57) ABSTRACT

A system and method for treating items suspected of insect infestation is described. The items are placed in a treatment space inside a treatment container together with a composition comprising one or more volatile components with insecticidal activity. The composition is applied to an absorbent material capable of containing the composition in a treatment amount; and the absorbent material and the composition are enclosed in a diffuser container with perforations covering about 1 to 30% of a surface area of the walls that allow diffusion of the one or more volatile components into the treatment space.

12 Claims, 4 Drawing Sheets

(51) Int. Cl.
*A01M 1/20* (2006.01)
*A01N 25/00* (2006.01)

(58) Field of Classification Search
USPC .......................................................... 239/6
See application file for complete search history.

(56) References Cited

U.S. PATENT DOCUMENTS

| | | | |
|---|---|---|---|
| 3,814,061 A | 6/1974 | Aries et al. | |
| 4,390,519 A * | 6/1983 | Sawyer | A61L 15/325 |
| | | | 128/DIG. 8 |
| 4,402,696 A * | 9/1983 | Gulko | A61F 13/0226 |
| | | | 424/448 |
| 4,470,962 A * | 9/1984 | Keith | A61K 9/70 |
| | | | 424/448 |
| 4,655,768 A * | 4/1987 | Marecki | A61M 35/00 |
| | | | 424/448 |
| 4,663,228 A * | 5/1987 | Bolton | B32B 15/04 |
| | | | 156/106 |
| 4,747,845 A * | 5/1988 | Korol | A61L 15/24 |
| | | | 424/443 |
| 4,797,284 A * | 1/1989 | Loper | A61K 9/7084 |
| | | | 424/448 |
| 4,923,745 A | 5/1990 | Wolfert et al. | |
| 2016/0286782 A1 | 10/2016 | Manhas et al. | |

FOREIGN PATENT DOCUMENTS

| | | |
|---|---|---|
| EP | 0 100 730 A1 | 2/1984 |
| GB | 631433 A | 11/1949 |
| WO | 2014/028835 A2 | 2/2014 |
| WO | 2015/031100 A2 | 3/2015 |
| WO | 2015/071890 A1 | 5/2015 |

OTHER PUBLICATIONS

Extended European Search Report for Application No. 16756466.5 dated Jun. 27, 2018.
Hot Shot Bedbug Mattress & Luggage Treatment Kit, https://images.homedepot-static.com/catalog/pdfimages/3e/3e383dcd-c0el-4bf7-a777-81be2d8b3f12.pdf, 7 pages (2011).
Miller, D., "Bed Bug Prevention Methods," http://www.vdacs.virginia.gov/pdf/bb-prevention1.pdf, 4 pages (Aug. 5, 2010).
No-Pest Strip, https://www.420magazine.com/com mun ity /th reads/ tu ngus-gnats. 73876/, 420 Magazine.com, 1 page (Mar. 11, 2008).
Perforation Without Limits, RMIG Pattern Catalogue 208, http://www.rmig.com/files/RMIG/PDF/UK/RM_Pattern_UK_208print.pdf, 36 pages. (2005).
Raid Moth Protection Hanger, SC Johnson, http://www.gnpd.com, 5 pages (Jul. 2010).
Raid—P04275744—Plaquette anti-mouche decor sans partum—2 pieces, https://www.amazon.fr/Raid-P04275744-Plaquette-anti-mouche-parfum/dp/BOOKE1382M/ref=pd_sbs_20l_7?_encoding=UTF88,p, 4 pages (May 17, 2014).
Raid Plaquette Anti Mouches, SC Johnson, https:/ /www.whatsinsidescjohnson.com/fr/fr/brands/raid/raid-plaquette-anti-mouches, 3 pages (Copyright 2018).
Rozendaal, J, "Vector Control: Methods for use by individuals and communities," Chapter 1—Mosquitos and Other Biting Diptera, World Health Organization, 4 pages (1997).
International Search Report and Written Opinion of the International Searching Authority for corresponding International Patent Application No. PCT/US2016/019823 dated Jun. 8, 2016, 9 pages.
"How Throwing in the Towel Can Help Win the Battle Against Bed Bugs—Cirkil Rag in a Bag", Jan. 1, 2013 (Jan. 1, 2013), pp. 1-4, XP55635689, U.S.A., Retrieved from the Internet: URL:https://www.doyourownpestcontrol.com/SPEC/technical-bulletin/RAG-IN-A-BAG-WhitePaper.pdf [retrieved on Oct. 24, 2019].

* cited by examiner

SYSTEM AND METHOD FOR TREATING ITEMS WITH INSECTICIDE

CROSS-REFERENCE TO RELATED APPLICATIONS

This application is a National Stage Application of PCT/US2016/019823 filed Feb. 26, 2016, which claims priority to Provisional Application Ser. No. 62/121,852 filed Feb. 27, 2015, and which applications are incorporated by reference herein in their entireties. To the extent appropriate, a claim of priority is made to each of the above disclosed applications.

FIELD

The present disclosure generally relates to the field of pest elimination including elimination of bed bugs. The present disclosure includes devices and methods to repel and/or eliminate bed bugs from personal belongings.

BACKGROUND

Bed bugs are small parasitic insects that feed solely on the blood of animals. The common bed bug, *Cimex Lectularius*, is adapted to living with humans and prefers feeding on human blood. Bed bugs have lived with humans since ancient times, although many people living in the United States have never seen a bed bug. However, increase of international travel in recent decades has contributed to a resurgence of bed bugs in the United States. Many aspects of bed bugs make their eradication difficult once bed bugs have established a presence in a location.

Adult bed bugs are about ¼ inch or about 4-6 millimeters long, 3-5 millimeters wide, and reddish-brown with oval, flattened bodies. The immature nymphs are similar in appearance to the adults but smaller and lighter in color. Bed bugs do not fly, but they can move very quickly over surfaces. Female bed bugs lay their eggs in secluded areas and can deposit up to five eggs per day, and as many as 500 during a lifetime. The bed bug eggs are very small, about the size of a dust spec. When first laid, the eggs are sticky, allowing them to adhere to surfaces. The eggs hatch in about one to three weeks and go through five nymphal stages before reaching maturity in about 35-48 days.

Bed bug infestations typically begin by a bed bug being carried into a new area. Bed bugs are able to cling to possessions and hide in small spaces so that they may easily be transported in belongings or in furniture being moved. As a result, buildings where turnover of occupants is high, such as hotels or apartments, are especially vulnerable to bed bug infestations.

Bed bugs prefer to hide close to where they feed and will typically find a shelter or hiding place, such as a small crack or crevice, in or around a bed or couch. The bugs may spend most of their time in hiding and only leave the shelter every 5-7 days to feed. Bed bugs are mainly active during the nighttime, making them hard to detect. Bed bugs find easy hiding places in beds, bed frames, furniture, along baseboards, in carpeting, behind loose wall paper, and countless other places. Once established in a location, bed bugs tend to congregate but do not build nests like some other insects.

Infestations are not likely to be eliminated by leaving a location unoccupied, as bed bugs can survive long periods of time without feeding. Adult bed bugs can persist months without feeding, and in certain conditions even up to a year or more. Nymphs can survive weeks or months without feeding.

Bed bugs obtain their sustenance by drawing blood through an elongated beak. They may feed on a human for 3 to 10 minutes at a time, although the victim is not likely to feel the bite. After the bite, the victim often experiences an itchy welt or swelling in the area of the bite. However, some people do not have any reaction or only a very mild reaction to a bed bug bite. Bed bug bites have symptoms that are similar to other insect bites, such as mosquitoes and ticks. It is not possible to determine whether the bite is from a bed bug or another type of insect without actually observing the bed bug in action. As a result, bed bug infestations may go long periods without being detected.

Bed bugs are difficult to eradicate, particularly with 100% efficacy, because of their tendency to hide, their ability to survive long times without food, and the small size of the eggs. It is against this background that the present disclosure is made.

SUMMARY

The present disclosure provides a system and method for treating items suspected of insect infestation, where the items are placed in a treatment space inside a treatment container together with a composition comprising one or more volatile components with insecticidal activity, where the composition is applied to an absorbent material capable of containing the composition in a treatment amount; and where the absorbent material and the composition are enclosed in a diffuser container with perforations covering about 1 to 30% of a surface area of the walls that allow diffusion of the one or more volatile components into the treatment space.

DETAILED DESCRIPTION

Figure 1A:
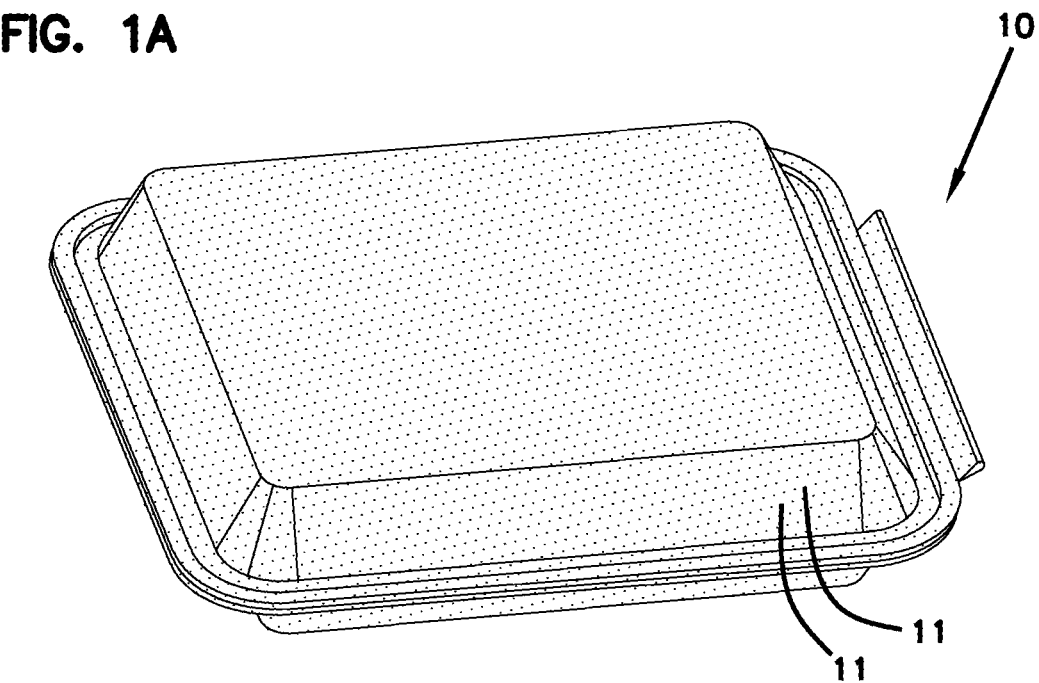
FIG. 1A shows a diffuser container according to an embodiment.

Pest removal services are often called upon to eradicate bed bugs or other insects, such as cockroaches, ants, termites, etc., in infested locations such as homes, hotels, offices, or theaters. Such services typically focus on eliminating bed bugs from building structures (e.g., walls, floors, posts, stair cases, etc.) and furniture. However, bed bugs may also need to be eradicated from smaller items, such as clothing, footwear, bags, purses, electronics, books, photo albums, paper products, magazines, office items and supplies, toys, tools, decorative items, pillows, rugs, bathroom items, cleaning supplies, etc. Because of the characteristics of bed bugs, particularly the tendency to hide, nocturnal activity, and resistance to some treatments, infestations can be hard to detect and eliminate. The system and method of this disclosure provide for an improved way to treat items that may be infested with crawling (i.e., non-flying) bugs, such as bed bugs, cockroaches, ticks, mites, ants, and other crawling arthropods, to help eliminate the infestation.

Various compositions for eliminating and/or repelling bed bugs are known. Examples of such compositions include commercially available products, such as CIRKIL® RTU available from Terramera Inc. in Ferndale, Wash.; Home Pest Bed Bug & Flea Killer available from Bayer Corp. in Pittsburgh, Pa.; Raid Max® Bed Bug & Flea Killer available from S.C. Johnson & Son in Racine, Wis. and Vapona® Concentrate Insecticide available from Bayer Corp. Other examples of suitable compositions include reduced or minimum risk pesticides, as defined by the EPA. For example, the composition may include castor oil, cedar oil, cinnamon oil, citronella and citronella oil, clove oil, corn oil, cottonseed oil, eugenol, garlic oil, geraniol, geranium oil, lauryl sulfate, lemon grass oil, linseed oil, mint oil, peppermint and peppermint oil, 2-phenethyl propionate (2-phenyethyl propionate), potassium sorbate, rosemary and rosemary oil, sesame and sesame oil, sodium lauryl sulfate, soybean oil, thyme and thyme oil, and combinations thereof. In preferred embodiments, the composition includes volatile components with insecticidal activity. In one exemplary embodiment, the composition comprises about 2 to about 10 wt-% or about 5 to about 6 wt-% cold-pressed neem oil. In another embodiment, the composition is a concentrate that comprises about 20 to about 99 wt-%, about 50 to about 95 wt-%, or about 75 to about 90 wt-% neem oil or the active compounds of neem oil (e.g., neem limonoids). The composition may also include other components that enhance the effectiveness of the composition, such as components that enhance volatility of other components, components that remove oxygen from the treatment space (e.g., chlorine dioxide), or components that release carbon dioxide to the treatment space. Other examples of suitable compositions include sulfur-containing compounds with insecticidal properties and acetone.

The compositions are typically in liquid form and can be applied by any suitable method, such as pouring or spraying. However, other forms, such as solids, gels, and semisolids are also possible. One issue sometimes experienced with the use of the compositions is that they may require a certain length of exposure time to be fully effective. According to some embodiments, the composition acts by the active components evaporating and diffusing into a closed treatment space. The treatment time should, therefore, account for evaporation time and exposure time. The exposure time may be about 24 hours or longer or about 48 hours or longer. The composition may be more effective if the items being treated are exposed to the composition (e.g., the evaporated components of the composition) for up to several days, or up to a week or two weeks.

One solution to ensure extended exposure time is provided by the Rag In A Bag® available from Terramera. In the Rag In A Bag system, personal items, including electronics, clothing, footwear, bags, etc. are placed in a large plastic bag with a rag infused with CIRKIL RTU bed bug treatment composition. The bag is sealed to allow the composition to evaporate and to expose the insects to the composition. The treatment time may be about 7 days. However, some users have experienced issues with the composition coming into contact with the items placed in the bag. The present disclosure provides an improved system and method for delivery of the composition into the treatment space.

According to embodiments, the system provides a slow release delivery of a volatile insecticide composition. The system comprises an absorbent material for containing the composition and a diffuser container that allows for diffusive delivery of the composition, where the absorbent material can be encased inside the diffuser container.

The absorbent material can comprise any suitable absorbent material, such as a fibrous material or fabric. Examples of suitable absorbent materials include cloth, rag, cotton wool, absorbent pads, cellulosic fibers, and the like. In an exemplary embodiment, the absorbent material is cotton, e.g., cotton terry cloth. According to embodiments, the absorbent material is capable of holding a volume of liquid composition, while allowing the composition to evaporate from the absorbent material. For example, about 2 to 250 mL, about 10 to 200 mL, or about 40 to 100 mL of the composition can be applied. In some embodiments, the composition is provided as a concentrate or as a thickened formulation (e.g., a gel), and the amount of absorbency needed from the absorbent material is less. If the composition is provided as a concentrate, the amount of composition applied can be about 0.1 to 20 mL, about 0.2 to about 10 mL, or about 0.5 to about 1 mL. For example, a concentrate composition can be applied dropwise from a dropper. The amount of absorbent material used can be adjusted based on the amount of composition used and the absorbency of the absorbent material.

The amount of composition used can be adjusted to reach a desired treatment concentration. The desired treatment concentration is a concentration at which the active components of the composition have an insecticidal effect on the target insect. Therefore, the amount of composition used will depend on the amount of active components in the concentration and the volume of air in the treatment container.

The diffuser container may be constructed to have a suitable construction, shape and size. For example, for treatment of larger numbers of items, a larger diffuser container can be used that fits more absorbent material. On the other hand, for treatment of a smaller number of items, a smaller diffuser container can be selected. Diffuser container sizes may range from about 10 mL to about 1000 mL, from about 50 mL to about 700 mL, from about 100 mL to about 600 mL, or from about 250 mL to about 500 mL. Small diffuser containers for treating a small treatment space (e.g., a treatment space of about 1-2 gallons) may be in the range of 20 to 150 mL. Medium diffuser containers for treating a medium sized treatment space (e.g., a treatment space of about 20-70 gallons) may be in the range of 200-600 mL. Large diffuser containers for treating a large treatment space (e.g., a treatment space of about 100-200 gallons) may be in the range of 600-1000 mL.

Figure 1B:
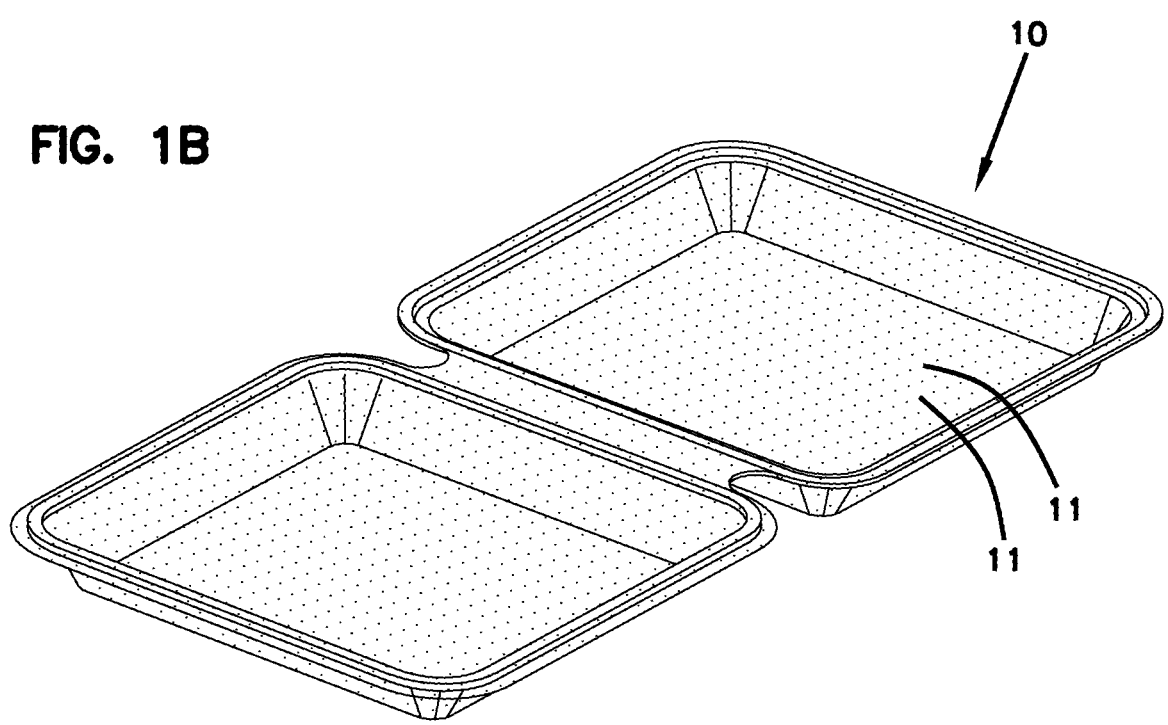
FIG. 1B shows the diffuser container of FIG. 1A in an open position.
Figure 2:
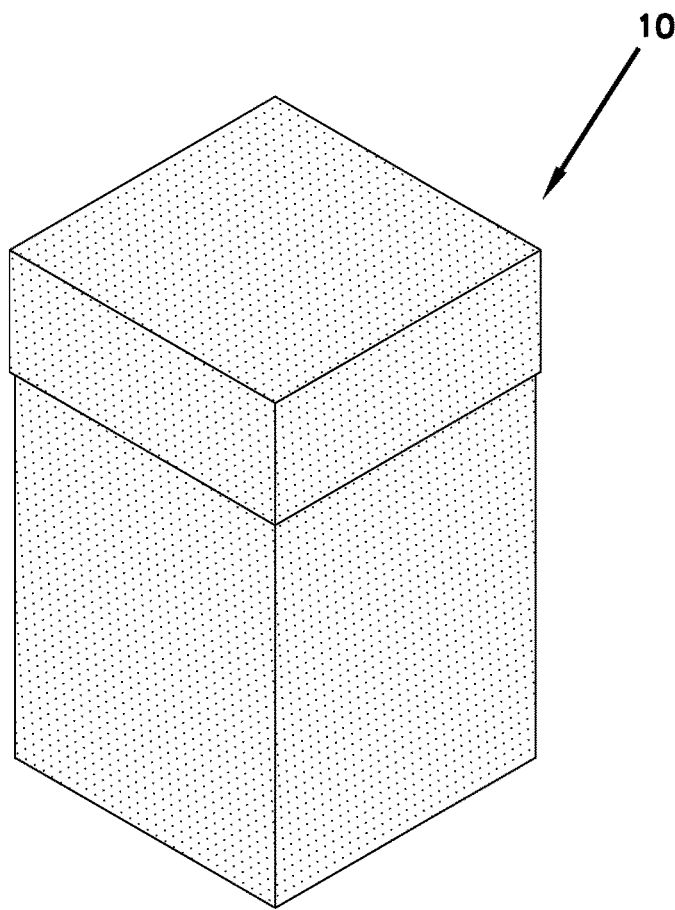
FIGS. 2-4 show various examples of diffuser containers according to embodiments.
Figure 3:
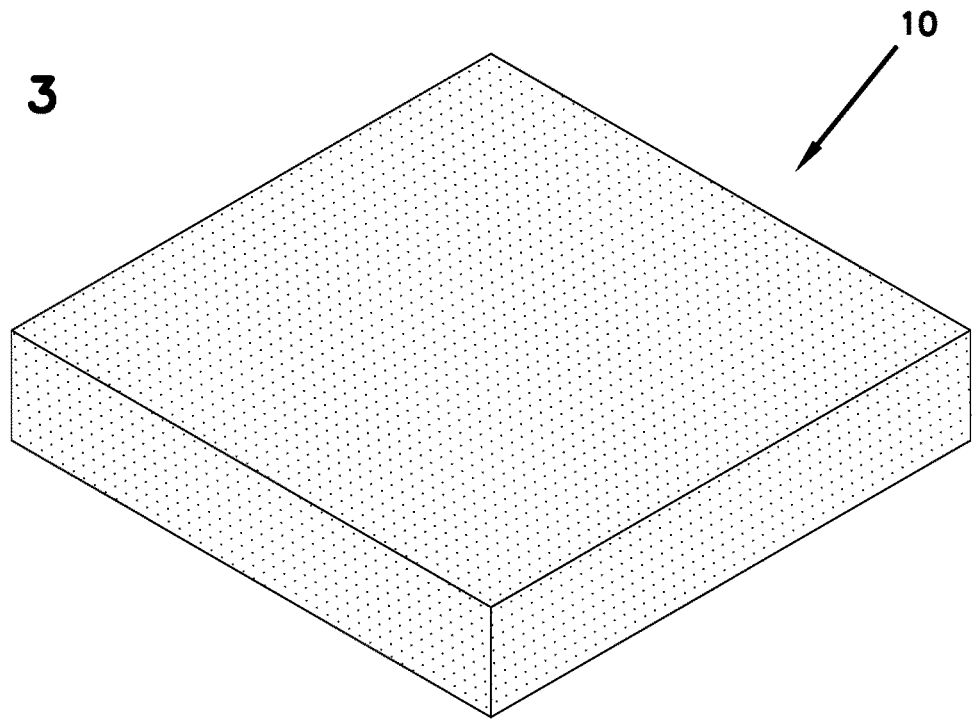
Figure 4:
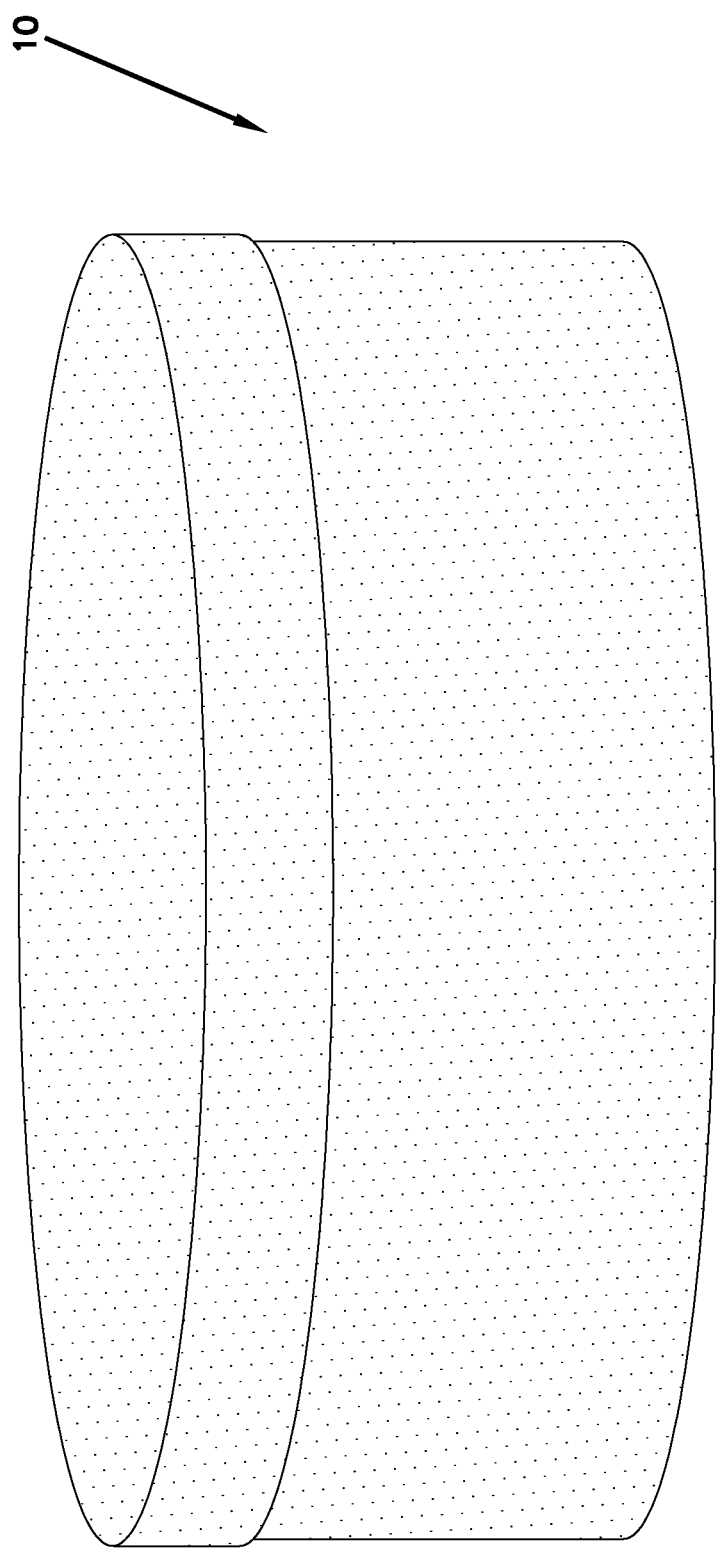

The diffuser container may have any suitable shape that can hold the absorbent material. For example, the diffuser container may have a rectangular or cuboid shape (FIGS. 2-3), a cylindrical (FIG. 4), conical, spherical, or irregular shape. The diffuser container may be constructed of two halves, such as a clam-shell type diffuser container (FIGS. 1A and 1B), or may include a container and a lid (FIGS. 2-4).

The diffuser container may be constructed of any suitable material, such as plastic, metal, fiber, fabric, or a paper product. Suitable plastics for the constructing the diffuser container include, for example, polyethylene terephthalate (PET), polystyrene, polyacrylic (e.g., polymethyl methacrylate), polyethylene, polypropylene, polycarbonate, polyvinylchloride, any other suitable plastics, and their combinations. Examples of suitable metals include pure metals such as aluminum, and alloys such as steel, and any other suitable metals and their combinations. Examples of suitable paper products include paper, paper board, cardboard, and any other suitable paper products. The paper product may optionally be coated (e.g., by a wax or polymer coating) to avoid leakage of the composition or absorption of the composition into the paper product. Suitable fibers and fabrics include, for example, woven and non-woven fabrics that may optionally be coated, fabric mesh, and any other suitable fiber or fabric materials. The diffuser container may also include a combination of any of the materials listed here. In some embodiments the diffuser container is rigid or semi-rigid and capable of holding its shape when placed inside the treatment container. In one embodiment, the diffuser container includes a tamper-proof mechanism that prevents inadvertent opening of the diffuser container, for example, by children after the composition has been placed in the diffuser container.

According to embodiments, the diffuser container is perforated with holes to allow evaporation of the composition into the treatment space. Exemplary embodiments of perforated diffuser containers 10 are shown in FIGS. 1A-4. The size, number, and location of the perforations 11 can be selected so that the composition diffuses at a suitable rate, depending on the volatility of components in the composition and on the intended exposure time. If the exposure time of the composition is intended to be approximately one week, the perforations can be configured so that the composition diffuses over the intended exposure time accordingly. In a preferred embodiment, the perforations and the volatility of the composition are configured to result in a suitable diffusion rate so that the composition does not pool in the diffuser container or drip or spill onto the items being treated.

The diffuser container comprises walls that define a surface area. In some embodiments, the diffuser container is perforated so that the perforations cover about 1 to about 30%, about 2 to about 25%, or about 5 to about 10% of the surface area of the walls of the diffuser container. The perforations can be distributed evenly throughout the surface of the diffuser container, or can be positioned on one or more sides of the diffuser container. In one embodiment, the perforations are distributed on at least two opposite sides of the diffuser container. The perforations do not necessarily need to be uniform in size or have a regular shape. The size of the perforations can vary and is inversely proportional to the number of perforations. For example, perforations may be about 0.5 to 20 mm, about 1 to 10 mm, or about 2 to 8 mm in diameter or width. The perforations may have an elongated shape, having a length of, for example, about 3 to 50 mm, about 5 to 40 mm, or about 10 to 30 mm. In one exemplary embodiment, the perforations are elongated, having a width of about 1 to 10 mm or about 2 to 6 mm, and a length of about 5 to 30 mm or about 8 to 20 mm In an embodiment, the perforations are positioned on the diffuser container so that, if any pooling of the composition occurs inside the diffuser container, the composition does not leak through the perforations.

In one exemplary embodiment, the diffuser container is a clam shell container constructed of PET plastic, having perforations of about 4 mm by 10-20 mm in size distributed throughout the walls of the diffuser container so that the perforations cover about 5% of the surface area of the diffuser container. The diffuser container may have a volume of about 250 mL, and have dimensions of about 14 cm×11 cm×4 cm.

In one embodiment, the perforations of the diffuser container are designed to produce a desired diffusion rate so that a desired treatment concentration of the composition can be achieved. For example, the diffuser container can be constructed so that the desired treatment concentration of the composition can be achieved in about 4 hours, about 6 hours, about 8 hours, about 10 hours, about 12 hours, about 15 hours, about 20 hours, or about 24 hours. Therefore, if an average of about 40 to 80 mL of composition is used, the diffuser container can be constructed to result in an average diffusion rate of about 0.5 to 10 g/h, about 1 to 8 g/h, or about 2 to 6 g/h. In an embodiment, active components of the composition remain in vapor state within the treatment space throughout the treatment time, or through at least a majority of the treatment time. Preferably, the active components are present in the treatment space in a sufficient concentration (e.g., the treatment concentration) to impart an insecticidal effect against the target insect.

Figure 5:
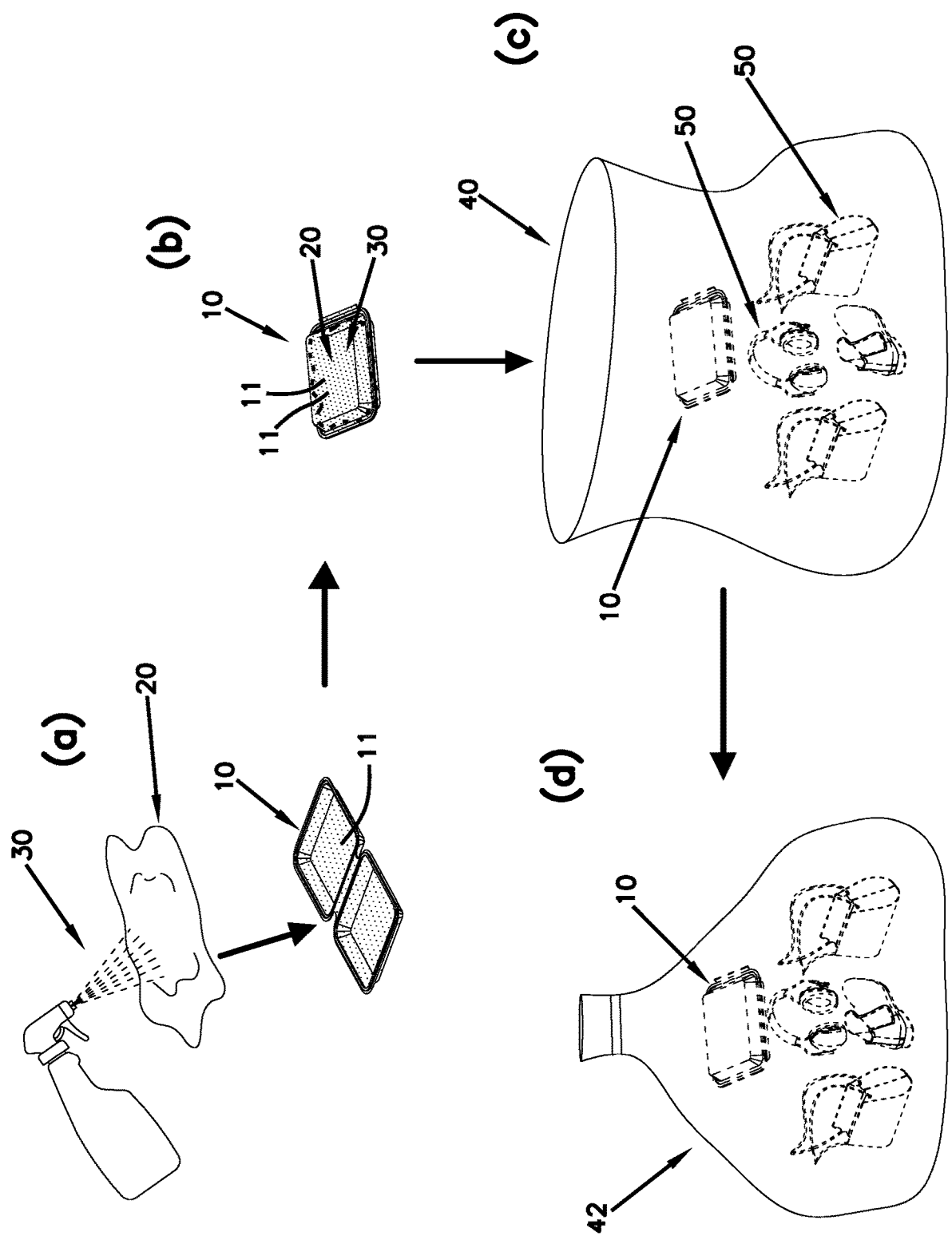
FIG. 5 shows a schematic depiction of a method of using the diffuser container of FIG. 1A according to an embodiment.

Referring now to FIG. 5, according to an embodiment, the composition 30 is applied to the absorbent material 20 in a suitable amount (step (a)). The amount applied can be adjusted based on the type and number of items to be treated and on the concentration of the composition. For example, about 10 to 150 mL, about 20 to 120 mL, or about 40 to 100 mL of a use solution of the composition can be applied. The absorbent material 20 with the applied composition 30 is enclosed in the diffuser container 10 (step (b)) and placed inside a treatment container 40 with the items to be treated 50 (step (c)). Alternatively the absorbent material 20 can be placed in the diffuser container 10 first, after which the composition 30 can be applied to the absorbent material 20. The treatment container 40 is closed and the items are allowed to be exposed to the composition 30 by evaporation through perforations 11 on the diffuser container 10 for the duration of the exposure time inside the closed treatment container 42 (step (d)).

In an alternative embodiment, the composition is provided pre-dispensed onto the absorbent material. For example, the composition and absorbent material can be provided in a sealed envelope that is opened by the user, similar to a wet wipe product. The composition and absorbent material can then be placed in the diffuser container and used as described.

Items that can be treated using the present system and method include, for example, clothing, footwear, bags, purses, electronics, books, photo albums, paper products, magazines, office items and supplies, toys, tools, decorative items, pillows, rugs, bathroom items, cleaning supplies, etc.

The treatment container 40 can be any suitable container to hold the amount or number of items to be treated 50. Exemplary treatment containers 40 include plastic bags, totes, buckets, and other suitable containers. Preferably, the treatment container 40 can be sealed for the duration of the treatment to hold in the composition and also to prevent any insects from escaping. The treatment container is closed and optionally sealed for the intended exposure time, such as for about 1 to 20 days, about 2 to 17 days, or about 3 to 14 days. In some embodiments, the exposure time is about 24 to about 48 hours or longer, or about 1 to 4 days, or about 2-3 days. The intended exposure time can be adjusted based on the composition used, the insects targeted, the items treated, and the severity of the infestation. The treatment container can optionally be opened and a second treatment dose applied, if necessary.

Example 1

Various diffuser containers were tested for their ability to allow adequate diffusion of the composition through the perforations in the container.

Materials:

Treatment container: plastic bags with a volume of about 40-45 gallons; the bags were filled about ⅔ full with packing peanuts.

Diffuser Containers:

Container A was a plastic container with a volume of about 250 mL, having 14 holes of 4 mm×10 mm at the top, and 14 holes of about 4 mm×16 mm at the bottom.

Container B was a plastic bag with a volume of about 400 mL that was used by leaving the mouth slightly open.

Container C was a plastic container with a volume of about 180 mL, having 14 round holes of about 1.5 mm in diameter.

Composition: CIRKIL® RTU available from Terramera Inc.

Absorbent material: a 12 inch by 12 inch cotton terry cloth towel was used with containers A and B, and a 9 inch by 17 inch paper towel with container C.

Insects: bed bugs were contained in sealed petri dishes with a mesh-covered hole for ventilation; 10 bed bug adults and nymphs and 10 eggs per dish.

Method:

Three petri dishes of bed bugs were placed in each treatment container, one dish in the bottom, one about the middle, and near the top. The diffuser containers were prepared by adding about 57 g (or 2 oz) of the composition to the absorbent material and enclosing the absorbent material inside each diffuser container. A diffuser container was placed inside each treatment container on top of the packing material. The treatment containers were sealed with tape. The treatment time was 1 week. After one week, the treatment containers were opened and the insects and diffuser containers examined.

It was observed that the kill rate in all three treatment containers was 100% (i.e., all bed bugs were eliminated). However, with regard to container C, some pooling of the composition inside the container was observed, indicating that the evaporation and diffusion of the composition was not adequate. With diffuser containers B and C, some shifting of the diffuser container during the test was observed, which allowed some of the composition to leak onto the packing materials from container C. It was further noted that application of the composition into diffuser container B (plastic bag) was difficult.

It was concluded that a diffuser container with adequate perforations should be selected to result in adequate evaporation and diffusion. It was further concluded that rigid or semi-rigid containers work best for ease of application.

While certain embodiments of the invention have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. A method for treating an item suspected of insect infestation comprising
    enclosing the item and a diffuser container inside a treatment container for a treatment time, the diffuser container comprising:
    (i) an absorbent material,
    (ii) 40 to 100 mL of a composition absorbed onto the absorbent material, the composition comprising 2 to 10 wt. % neem oil; and
    (iii) perforations; wherein the diffuser container is constructed to allow diffusion of the neem oil through the perforations during the treatment time at a rate of 0.5 to 10 grams per hour.

2. The method of claim 1, wherein the treatment container defines a treatment space inside the treatment container, wherein the neem oil is present at a treatment concentration in the treatment space for at least a majority of the treatment time, and wherein the treatment concentration has an insecticidal effect on a target insect.

3. The method of claim 1, wherein the treatment time is between 3 to 21 days.

4. The method of claim 1, wherein the treatment time is 24 to 48 hours.

5. The method of claim 1, wherein the absorbent material is selected from the group consisting of cloth, rag, cotton, wool and cellulosic fibers.

6. The method of claim 1, wherein the absorbent material is configured as a pad.

7. The method of claim 1, wherein the diffuser container volume is 250 mL to 500 mL.

8. The method of claim 1, wherein the diffuser container volume is 20 to 150 mL.

9. The method of claim 1, wherein the diffuser container is a material selected from the group consisting of plastic, metal, fiber, fabric, paper, and combinations thereof.

10. The method of claim 1, wherein the perforations on the diffuser container are located on one side of the diffuser container.

11. The method of claim 1, wherein the perforations on the diffuser container are located on more than one side of the diffuser container.

12. The method of claim 1, the diffuser container further comprising a removable seal covering the perforations.

* * * * *